United States Patent Office 3,230,090
Patented Jan. 18, 1966

3,230,090
SHORTENING COMPOSITION
Theodore J. Weiss, Park Forest, Ill., assignor to Swift & Company, Chicago, Ill., a corporation of Illinois
No Drawing. Filed Nov. 6, 1961, Ser. No. 150,161
9 Claims. (Cl. 99—123)

This invention relates to improved fatty materials and, more particularly, to a method for improving the shortening properties of glyceride materials and to the improved shortening agents.

In the manufacture of confectionery and bakery products, shortenings of the compound or blended type and all hydrogenated shortenings may be employed. Shortening materials have become rather specialized in that specially formulated shortenings for cake baking, yeast-raised doughs, and icings having distinctive functional properties well adapted to the particular area of use are employed. For general bake shop, hotel and restaurant use general purpose shortenings may be employed, while superglycerinated shortenings are particularly effective in cakes, yeast-raised doughs and similar baked goods. In addition to the variations in plasticity and the amount of hydrogenated material contained therein, shortenings have been modified by the incorporation in the shortening of surface-active materials. Commercial monoglycerides which are usually a mixture of monoglycerides, diglycerides, and triglycerides have been employed with good success in shortenings designed for use in the cake baking industry, while other surface-active agents such as the lacto fatty acid monoglycerides have also been found to provide superior qualities in shortenings in which they are incorporated.

Polyglycerol esters of higher fatty acids and mixtures of such esters are very effective surface-active agents useful in imparting to fat-containing materials, which also contain an appreciable amount of water, good creaming properties. While these polyglycerol esters provide a marked interface modifying power when employed as improving agents in fatty materials which contain an appreciable amount of water, their use has been restricted to such fatty materials containing water. The polyglycerol esters have not been used in fatty compositions which are relatively free of water because of the lack of dispersibility of the polyglycerol esters in substantially water-free materials. Most shortenings contain no more than trace amounts of water and, thus, when polyglycerol esters are added to such fats in melted condition during shortening manufacture, the esters are not distributed throughout the fat, but tend to settle out as a tarry residue sticking to the walls of containers, pipes, and other equipment.

It is, accordingly, an object of this invention to provide improved shortening agents containing polyglycerol ester emulsifiers which are dispersible in said shortening.

Another object of this invention is to provide additives for shortenings which are substantially free of water said additives containing hydrophilic polyglycerol esters as a component.

Still another object of the invention is to provide a method for preparing a shortening adapted for use in the preparation of icings, containing in a dispersible form a normally immiscible hydrophilic polyglycerol ester emulsifier.

Additional objects of the invention, if not specifically set forth herein will be readily apparent to those skilled in the art from the detailed description of the invention which follows.

Generally, the present invention comprises an icing or cream filler shortening composition comprising a shortening agent and a small amount of an emulsifier of the polyglycerol ester type, along with a coupling agent to render the polyglycerol ester dispersible in the shortening. The shortening composition is highly effective in the production of icings and cream fillers and in other cooking and baking operations wherein highy functional shortenings are required.

More particularly, the invention is concerned with a method whereby emulsifiers of the type represented by esters of polyglycerols are utilized in shortening compositions in which it had previously been considered such materials could not be employed. The method contemplates incorporating in shortening compositions higher fatty acid esters of polyglycerols and a small amount sufficent to render said emulsifier dispersible in said shortening of a coupling agent. The shortening containing the emulsifier and coupling agent may be provided as a unitary product or the coupling agent and emulsifier can be provided as a mixture which can be added to the shortening material.

Icings for pastry products are prepared from a mixture of powdered sugar, milk or water, flavoring materials, and shortening with the mixture being beaten to incorporate air into the icing. Large quantities of emulsifiers and shortening agents are consumed in making icings for various pastry products. These icing or cream filler compositions may be placed between layers of cake or incorporated within a pastry product in which the materials are referred to as cream fillers rather than icings which are generally placed on the surface of the bakery product. The appearance, texture, and volume of cream fillers are important factors in evaluating such products. These characteristics of the icings or cream fillers will be affected to a great degree by the shortening agent employed in the preparation of the icing or cream filler. It has been found that the absence or presence of an emulsifier in the shortening composition may mean the difference between a satisfactory or unsatisfactory icing or cream filler.

Polyglycerol esters such as the higher fatty acid esters of polyglycerols having several glycerol radicals can be prepared by polymerizing glycerol with alkali to form a mixture of glycerol, diglycerol, triglycerol, tetraglycerol, pentaglycerol, etc. up to and including decaglycerol. The polyglycerol mixture is then reacted with higher fatty acids in an esterification process or is catalytically interesterified with triglycerides such as the naturally occurring fats and oils to produce mixed esters of polyglycerols with the fatty acyl groups being randomly distributed on individual glycerol radicals. The suitability of polyglycerol esters as surfactants in fatty compositions is measured by average molecular weight and refractive index which in effect measure the number of glycerol units in the composition. Generally, those polyglycerol esters of higher fatty acids having 2–10 glycerol units and preferably 3–8 glycerol units are most effective. A refractive index (butyro scale) of 75–95 and preferably in the range of 80–92 characterizes the most satisfactory polyglycerol ester emulsifiers.

Those esters of fatty acids of 10–22 carbons are particularly desirable as the acyl component of the polyglycerol esters. Polyglycerol esters containing as the fatty acyl component fatty acids and mixed fatty acids derived from animal, vegetable, and marine triglylcerides are conveniently prepared by esterifying cottonseed fatty acids, soybean fatty acids, peanut oil fatty acids, tallow fatty acids, etc., with polyglycerol or by interesterifying the natural triglyceride with polyglycerol.

The amount of polyglycerol esters which is employed to improve the creaming and shortening properties of a given shortening agent is variable, depending upon the particular shortening, and the particular polyglycerol ester, but generally around 1–5% of the emulsifier based on the shortening composition, imparts markedly improved properties to the shortening.

The coupling agents which have been found effective in promoting miscibility or dispersibility of the polyglycerol ester emulsifiers in the shortening composition are lower aliphatic alcohols and aliphatic glycols generally. The lower monohydric aliphatic alcohols of 2–4 carbons such as ethanol, butanol, and isopropanol are effective in coupling the emulsifier with the shortening. Alkylene glycols of 2–6 carbons such as ethylene glycol, the propylene glycols and butylene glycols also are effective in the compositions of the invention as are pentanediols and hexanediols. Substituted glycols such as 3-ethyl-1,2-propanediol and 3-methoxy-1,2-propanediol are also suitable.

Suitable polyoxyalkylene glycols include those polyoxyalkylene glycols represented by the structure $$R\text{—}OCH_2CH_2O\text{—}(CH_2CH_2O)_x\text{—}H$$

where R is selected from the group consisting of hydrogen and lower alkyl radicals of 1–4 carbons and X is 1–7. Included in this group are diethylene glycol, dipropylene glycol, triethylene glycol, hexaethylene glycol, and the carbitols and Cellosolves having one terminal hydroxyl group etherified with a lower alkyl group such as methyl or butyl. Monoethyl and monobutyl ethers of ethylene glycol and diethylene glycol are representative of these compounds.

The emulsifier composition, as has been noted previously is employed in the shortening agent in an amount of about 1–5% based on weight of the shortening. The coupling agent, on the other hand, can be employed in an amount of about one-third to about equal parts of the polyglycerol ester. Larger amounts, while not necessarily adversely affecting the composition, are considered wasteful.

*Example I*

In order to demonstrate the benefits of the invention, a cream filler composition was prepared and the specific gravity of the cream filler containing varying amounts of different surface-active compositions, including the surface-active agent of this invention containing coupling agent, were compared. The cream filler contained the following ingredients:

| Component: | Amount, lbs. |
|---|---|
| Sugar | 42.8 |
| Shortening with emulsifier | 25.3 |
| Nonfat milk solids | 6.4 |
| Salt | 0.2 |
| Water | 25.1 |
| Vanila | 0.2 |

The ingredients of the cream filler were whipped together at high speed for about 20 minutes and the specific gravity of the filler was measured, the specific gravity being used as an index of emulsifier performance. The lower the specific gravity, the more effective is the emulsifier.

The following table shows the specific gravity of the cream filler prepared with a shortening containing different emulsifiers:

TABLE I

| | Specific gravity |
|---|---|
| Shortening containing 5% commercial monoglycerides | .570 |
| Shortening containing 2% polyglycerol esters | .470 |
| Shortening containing 2.5% polyglycerol esters | .430 |
| Shortening containing 5% polyglycerol esters | .350 |

The shortening composition employed is

| | |
|---|---|
| Crystal modified lard | 90% |
| Fully hydrogenated cottonseed oil | 10% | and the coupling agent which was employed to render the polyglycerol esters dispersible is 1,2-propanediol at the level of one part of propanediol to 2–2.5 parts of the polyglycerol ester emulsifier. The polyglycerol esters were prepared from tallow fatty acids and had an average of about 5 glycerol units per molecule.

*Example II*

A batch of 2,500 lbs. of hydrogenated cottonseed oil shortening was heated to 140° F. and agitated, while 50 lbs. of a polyglycerol ester emulsifier and 25 lbs. of 1,2-propanediol were added to the melted shortening. Dispersion was brought about by the use of a high speed propeller tylpe mixer. The shortening was then chilled and packaged in the normal manner. A similar shortening containing the same polyglycerol ester emulsifier, but none of the glycol, could not be formulated so as to disperse the emulsifier. Rather, the emulsifier settled out and concentrated as a tarry residue.

A unitary shortening agent particularly adapted for use in the production of icings where low specific gravity and good body of the icing is desired can be formulated from vegetable and meat fat plastic shortenings containing a polyglycerol ester emulsifier and the coupling agents disclosed herein. The mixture of the coupling agent and emulsifier can be dispersed in the shortening by any of the methods conventionally employed for dispersing such materials in fats. Edible plastic shortening agents containing no more than 1% water, and usually far less than 1% water, can thus be formulated with the higher fatty acid esters of polyglycerols to take advantage of the superior emulsifying properties of such compositions and also to avoid the lack of dispersibility of such compositions in fatty materials. Other polyglycerol esters wherein the fatty acyl component is derived from hydrogenated and unhydrogenated tallow fatty acids and cottonseed fatty acids provide an improvement similar to that illustrated in Example I.

Obviously, many modifications and variations of the invention as hereinbefore set forth may be made without departing from the spirit and scope thereof and, accordingly, only those limitations should be imposed as are indicated in the appended claims.

I claim:

1. A substantially water-free shortening agent comprising; a major amount of a triglyceride material having shortening properties and a small amount sufficient to improve the creaming properties of said shortening of surface-active higher fatty acid esters of polyglycerols and a coupling agent to disperse said surface-active agent in said shortening, said coupling agent being selected from the group consisting of monohydric aliphatic alcohols of 2–4 carbons, alkylene glycols of 2–6 carbons, and polyoxyalkylene compositions characterized by the structure $$R\text{—}OCH_2CH_2O(CH_2CH_2O)_xH$$

where R is selected from the group consisting of hydrogen and lower alkyl radicals of 1–4 carbons, and where X is 1–7.

2. The shortening agent of claim 1 wherein the triglyceride material is primarily derived from animal fat.

3. The shortening agent of claim 1 wherein the triglyceride material is primarily derived from vegetable fat.

4. A substantially water-free shortening agent comprising: a major amount of a triglyceride material having shortening properties, a higher fatty acid ester of polyglycerols having an average of about 2–10 glycerol units and a coupling agent selected from the group consisting of monohydric aliphatic alcohols of 2–4 carbons, alkylene glycols of 2–6 carbons, and polyoxyalkylene compositions characterized by the structure $$R\text{---}OCH_2CH_2O(CH_2CH_2O)_xH$$

where R is selected from the group consisting of hydrogen and lower alkyl radicals of 1–4 carbons, and where X is 1–7.

5. A substantially water-free shortening agent comprising: a major amount of a triglyceride material having shortening properties and around 1–5% based on the weight of said triglyceride material of higher fatty acid esters of polyglycerols, said esters having a refractive index on the butyro scale of around 75–95, and a coupling agent selected from the group consisting of monohydric aliphatic alcohols of 2–4 carbons, alkylene glycols of 2–6 carbons, and polyoxyalkylene compositions characterized by the structure $$R\text{---}OCH_2CH_2O(CH_2CH_2O)_xH$$

where R is selected from the group consisting of hydrogen and lower alkyl radicals of 1–4 carbons, and where X is 1–7.

6. A substantially water-free shortening agent comprising: a major amount of a triglyceride material having shortening properties, around 1–5% based on the weight of said triglyceride material of higher fatty acid esters of polyglycerols and around .3 to 1 part based on each part of polyglycerol of a material selected from the group consisting of monohydric aliphatic alcohols of 2–4 carbons, alkylene glycols of 2–6 carbons, and polyoxyalkylene compositions characterized by the structure $$R\text{---}OCH_2CH_2O(CH_2CH_2O)_xH$$

where R is selected from the group consisting of hydrogen and lower alkyl radicals of 1–4 carbons, and where X is 1–7.

7. A method for preparing a shortening for use in icings comprising: incorporating in a shortening agent containing not more than about 1% water hydrophilic higher fatty acid esters of polyglycerols which esters are immiscible with said shortening and a small amount sufficient to render said esters miscible of a material selected from the group consisting of monohydric aliphatic alcohols of 2–4 carbons, alkylene glycols of 2–6 carbons, and polyoxyalkylene compositions characterized by the structure $$R\text{---}OCH_2CH_2O(CH_2CH_2O)_xH$$

where R is selected from the group consisting of hydrogen and lower alkyl radicals of 1–4 carbons, and where X is 1–7.

8. A fatty shortening composition comprising a major amount of a glyceride material and a minor amount of surface-active esters of polyglycerols normally not dispersible in said glyceride material, said composition containing 1,2-propanediol in an amount sufficient to disperse said esters in said glyceride material said composition containing not more than about 1% water.

9. A fatty shortening composition comprising a major amount of a glyceride material and a minor amount of surface-active esters of polyglycerols normally not dispersible in said glyceride material, said composition containing triethylene glycol in an amount sufficient to disperse said esters in said glycerine material said composition containing not more than about 1% water.

References Cited by the Examiner
UNITED STATES PATENTS

| | | | |
|---|---|---|---|
| 2,132,417 | 10/1938 | Harris | 99—123 X |
| 2,269,529 | 1/1942 | Goldsmith | 260—410.6 X |
| 2,677,700 | 5/1954 | Jackson et al. | 260—410.6 X |
| 2,977,283 | 3/1961 | Meyer et al. | 99—123 X |

OTHER REFERENCES

Glycols, pub. by Carbide and Carbon Chemicals Corporation, 1950.

Miner et al., "Glycerol," 1953, Rheinhold Pub. Co., New York, pp. 365–368.

A. LOUIS MONACELL, *Primary Examiner.*